(12) United States Patent
Imaeda et al.

(10) Patent No.: US 8,600,625 B2
(45) Date of Patent: Dec. 3, 2013

(54) DISPLAY CONTROL DEVICE

(75) Inventors: Kouji Imaeda, Nagoya (JP); Yasutoshi Horii, Nagoya (JP)

(73) Assignee: Denso Corporation, Kariya (JP)

( * ) Notice: Subject to any disclaimer, the term of this patent is extended or adjusted under 35 U.S.C. 154(b) by 912 days.

(21) Appl. No.: 12/350,400

(22) Filed: Jan. 8, 2009

(65) Prior Publication Data

US 2009/0187307 A1 Jul. 23, 2009

(30) Foreign Application Priority Data

Jan. 18, 2008 (JP) ................................. 2008-009254

(51) Int. Cl.
*B60R 22/00* (2006.01)
(52) U.S. Cl.
USPC .......................................................... 701/49
(58) Field of Classification Search
USPC ..................................................... 701/36, 49
See application file for complete search history.

(56) References Cited

U.S. PATENT DOCUMENTS

| | | | | |
|---|---|---|---|---|
| 4,519,193 A * | 5/1985 | Yoshida et al. | ............... | 56/328.1 |
| 6,266,589 B1 * | 7/2001 | Boies et al. | ...................... | 701/36 |
| 7,980,782 B2 * | 7/2011 | Bleiner et al. | ..................... | 404/9 |
| 8,401,758 B2 * | 3/2013 | Stahlin et al. | .................... | 701/70 |
| 2003/0052797 A1* | 3/2003 | Rock et al. | ..................... | 340/936 |
| 2007/0100545 A1* | 5/2007 | Morita et al. | .................. | 701/211 |
| 2007/0242470 A1 | 10/2007 | Michiyama | | |
| 2007/0268159 A1* | 11/2007 | Futamura | ....................... | 340/933 |
| 2007/0280503 A1* | 12/2007 | Kubota et al. | ................. | 382/103 |
| 2008/0129544 A1* | 6/2008 | Augst | ......................... | 340/932.2 |
| 2010/0017111 A1* | 1/2010 | Stefani | ........................... | 701/201 |
| 2010/0066515 A1* | 3/2010 | Shimazaki et al. | ............ | 340/435 |

FOREIGN PATENT DOCUMENTS

| | | |
|---|---|---|
| JP | 05-018951 | 3/1993 |
| JP | 06-068379 | 3/1994 |
| JP | 09-073600 | 3/1997 |
| JP | 2004-136838 | 5/2004 |
| JP | 2005-071731 | 3/2005 |
| JP | 2005-306337 | 11/2005 |
| JP | 2005-329819 | 12/2005 |
| JP | 2006-242905 | 9/2006 |
| JP | 2007-276704 | 10/2007 |

OTHER PUBLICATIONS

USPTO Jul. 2011 translation of Japan application No. H03-076356 to inventor Nobuyoshi Yoshikawa with publication date Mar. 9, 1993.*
Japanese Office Action dated Dec. 1, 2009, issued in corresponding Japanese Application No. 2008-009254, with English translation.

* cited by examiner

*Primary Examiner* — Valerie Lubin
*Assistant Examiner* — Robert Sorey
(74) *Attorney, Agent, or Firm* — Nixon & Vanderhye PC

(57) ABSTRACT

A light ECU in a light control device performs a display process of obtaining speed limit information at a current position of the driver's vehicle on a road and of instructing a pixel light system to display the speed limit information on the surface of the road. The light control device can project the speed limit information for the drivers vehicle onto the road. Further, the light control device judges whether or not the vehicle speed information is not less than a predetermined reference speed, and performs the process of displaying the vehicle speed information on the road only when the vehicle speed information is not less than a predetermined reference speed. The above control process displays the vehicle speed information on the road only when necessary, allows the driver of the vehicle only to recognize important information, and provides the driver of the vehicle with safer driving conditions.

9 Claims, 12 Drawing Sheets

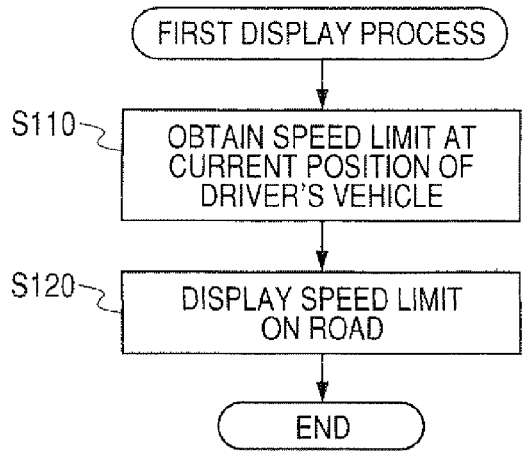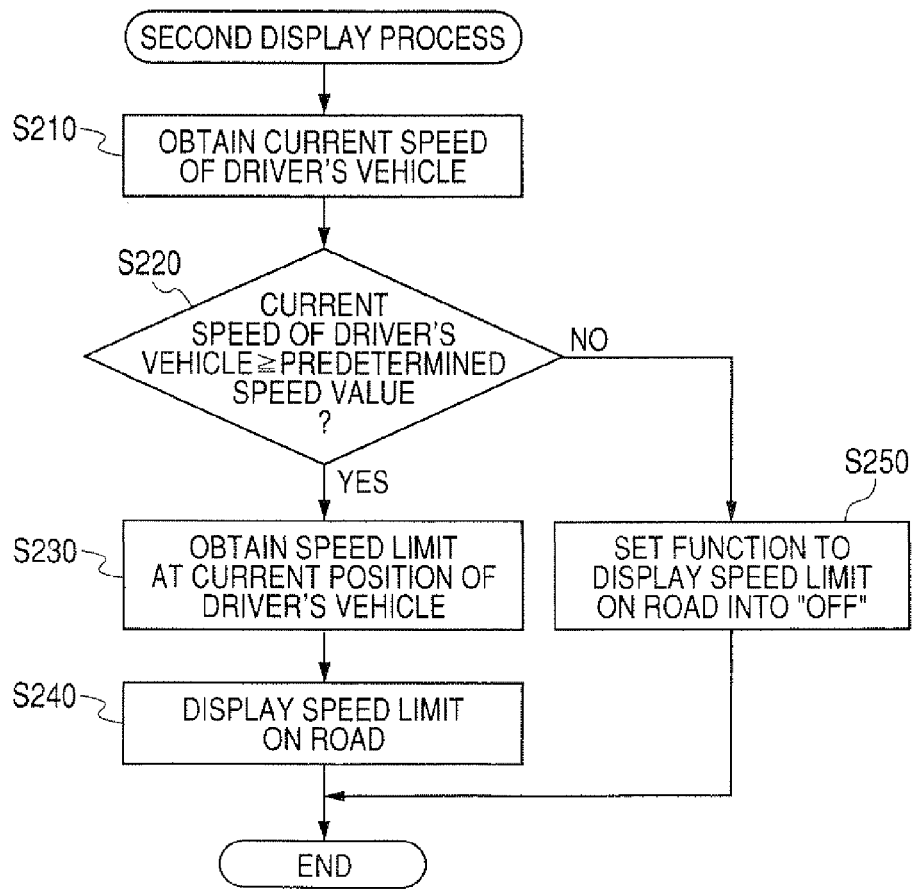

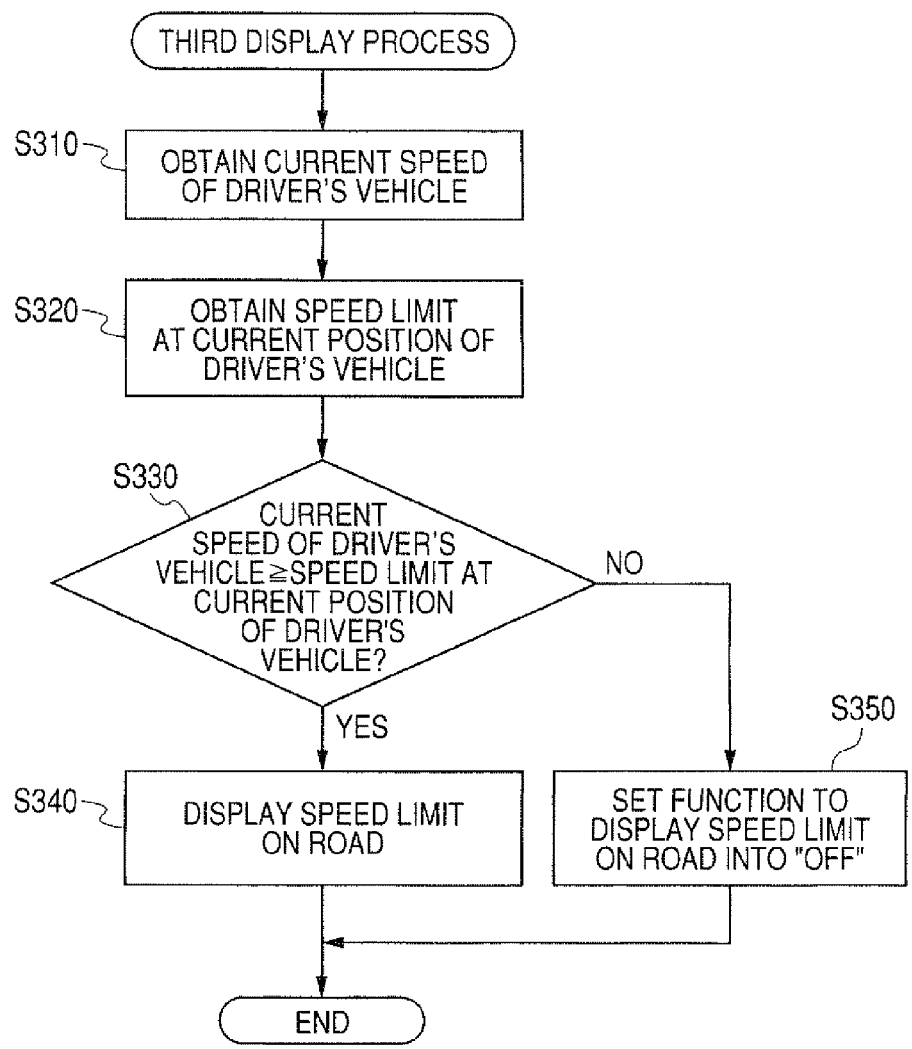

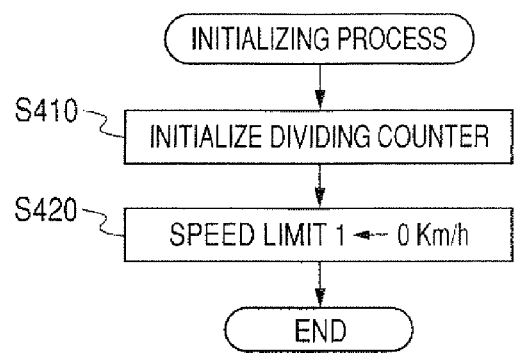
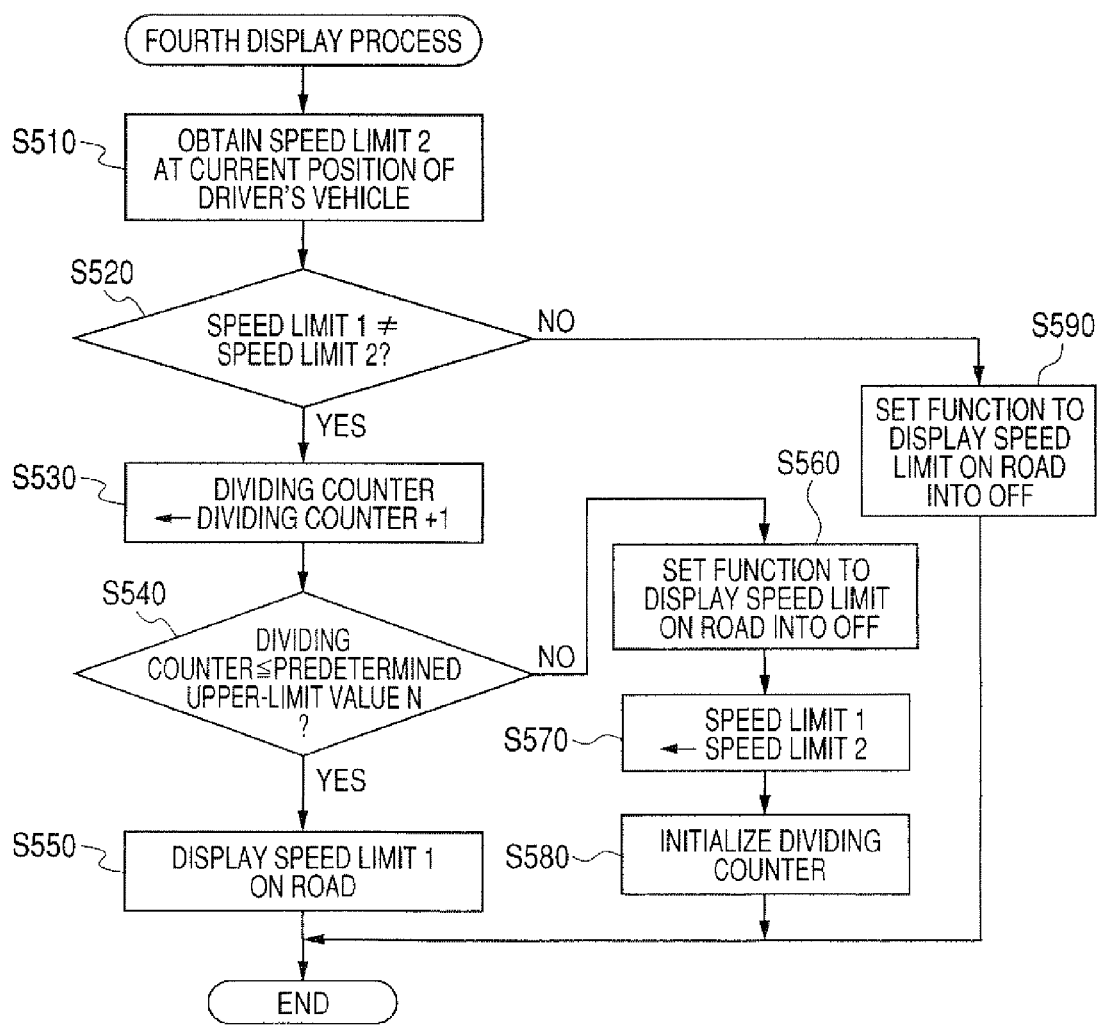

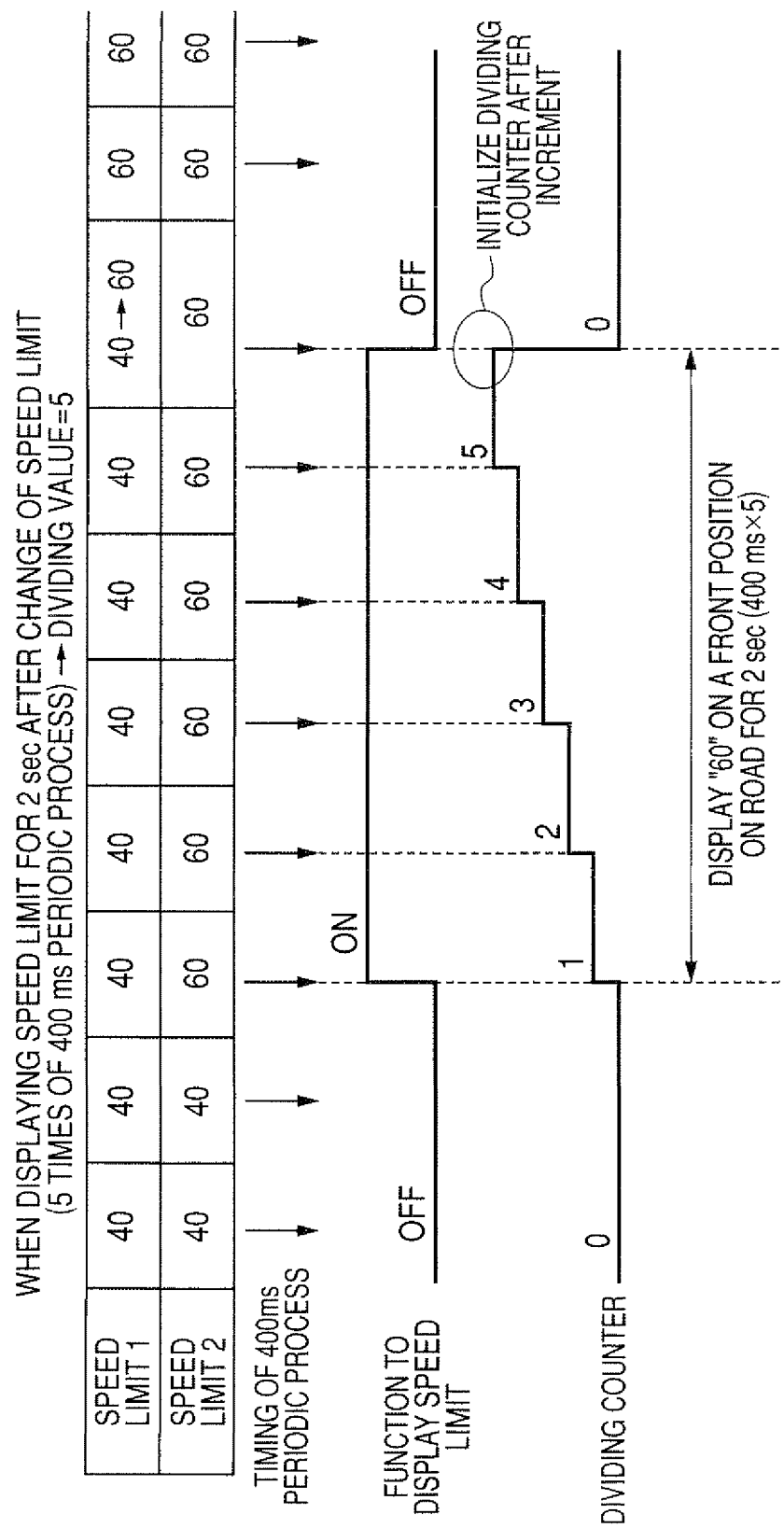

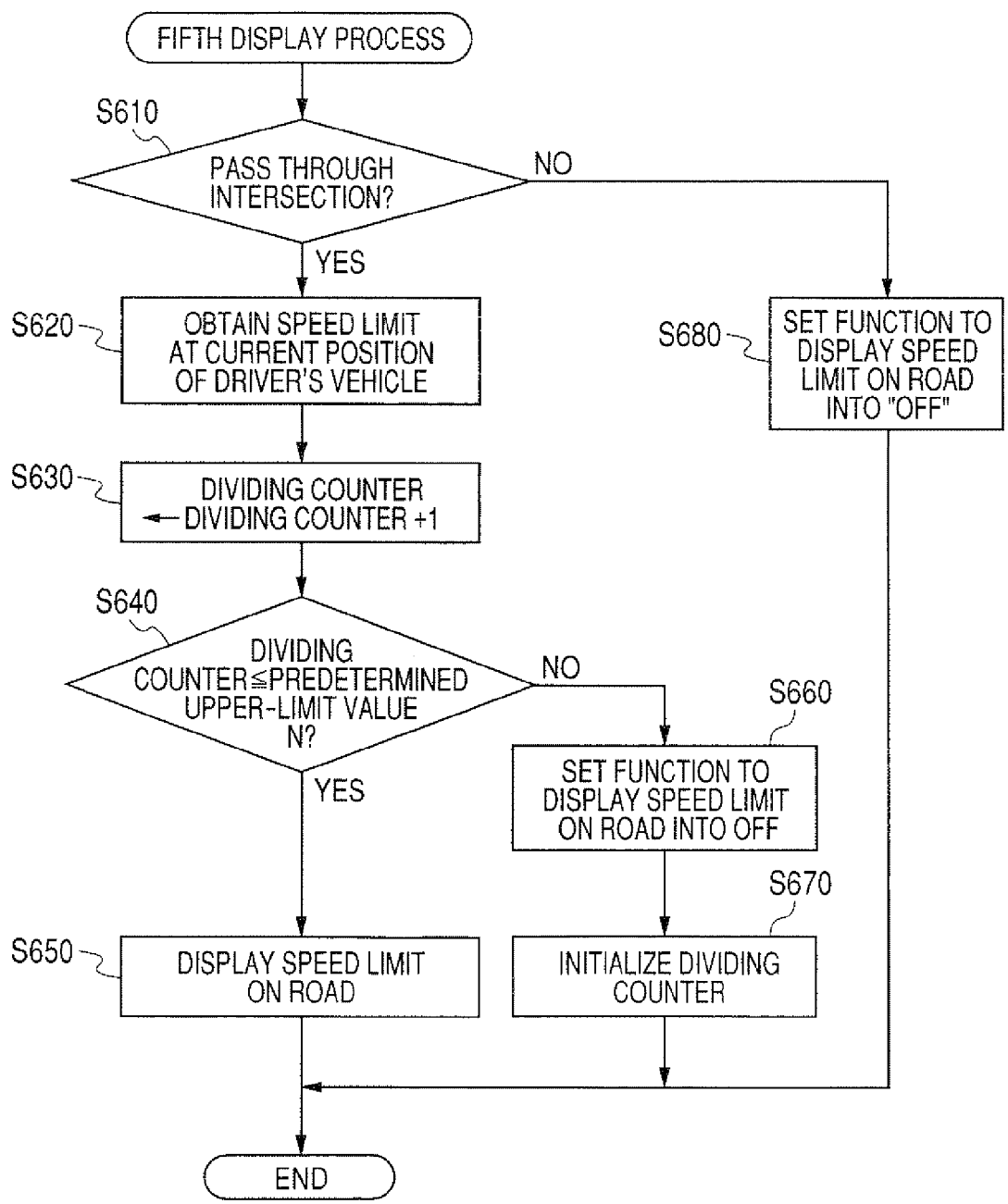

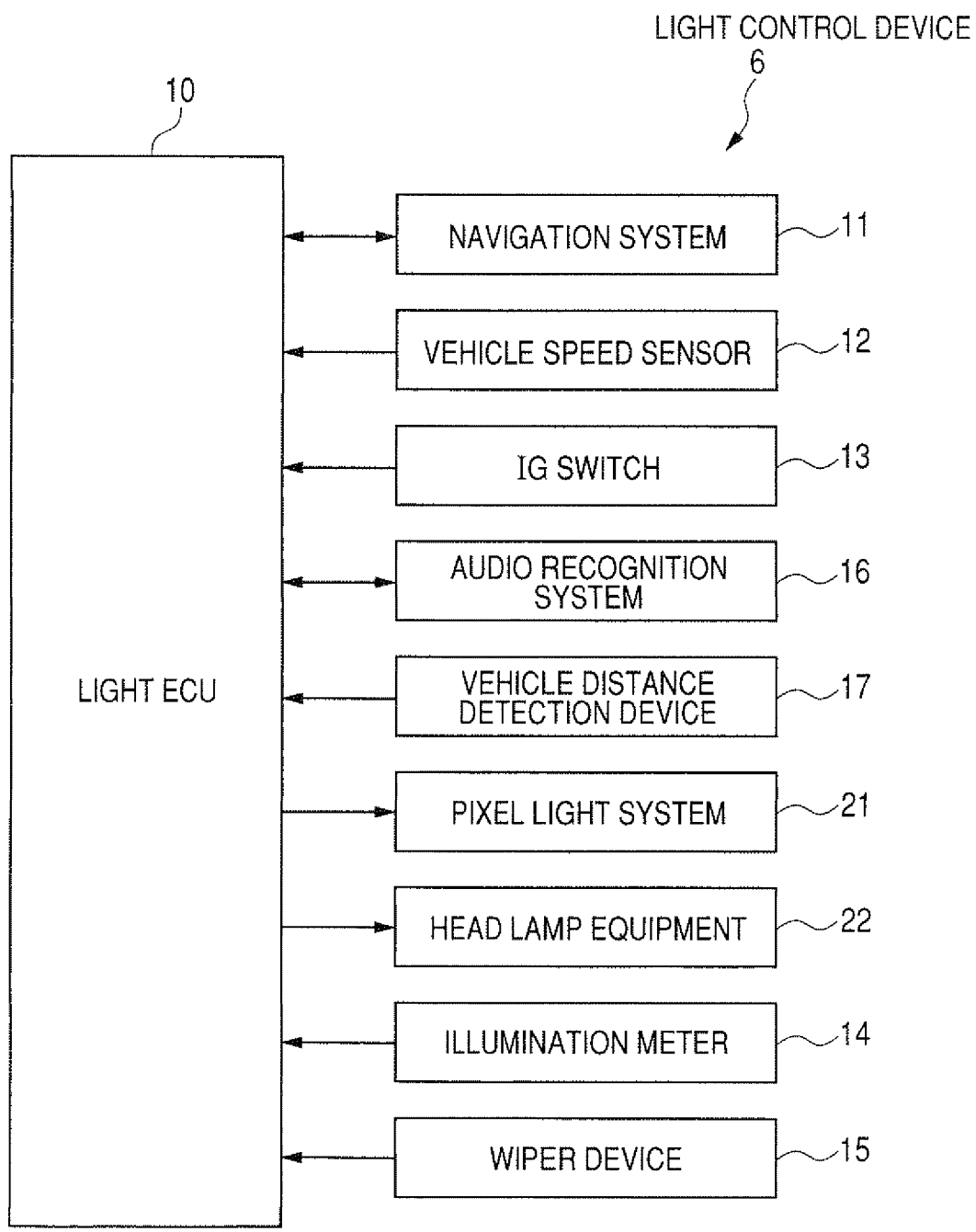

DISPLAY CONTROL DEVICE

CROSS-REFERENCE TO RELATED APPLICATION

This application is related to and claims priority from Japanese Patent Application No. 2008-9254 filed on Jan. 18, 2008, the contents of which are hereby incorporated by reference.

BACKGROUND OF THE INVENTION

1. Field of the invention

The present invention relates to a display control device that displays vehicle information such as vehicle speed and speed limit on the road, for example, on the surface of the roads on which the driver's vehicle runs.

2. Description of the Related Art

There have been disclosed many conventional display control devices capable of projecting vehicle information such as position information of the driver's vehicle on the road. However no conventional display control devices display any vehicle speed information actually on the road surface.

SUMMARY OF THE INVENTION

It is an object of the present invention to provide a display control device capable of displaying vehicle speed information in addition to vehicle information on the road on which the driver's vehicle (or own vehicle) drives.

To achieve the above purpose, the present invention provides a display control device mounted on a vehicle. The display control device has a speed information obtaining means, an irradiating means (or a projection means), and a display control means. The speed information obtaining means obtains vehicle speed information relating to the driver's vehicle. The irradiating means irradiates (or the projection means projects) an image in order to display the vehicle speed information on the road on which the driver's vehicle drives. The display control means controls the irradiating means to display the vehicle speed information obtained by the speed information obtaining means.

The display control device having the above structure according to the present invention can display the vehicle speed information of the driver's vehicle on the road. It is thereby possible for the vehicle driver to easily recognize the vehicle speed information such as a current vehicle speed and the speed limit of the road at the current position of the driver's vehicle without changing the line of driver's eyes. This achieves safer driving of the driver's vehicle.

The vehicle speed information of the driver's vehicle obtained by the speed information obtaining means include a vehicle speed of the driver's vehicle, speed limit information at a current position of the driver's vehicle on the road, and other speed information which the driver of the vehicle needs on driving the vehicle on the road.

BRIEF DESCRIPTION OF THE DRAWINGS

A preferred, non-limiting embodiment of the present invention will be described by way of example with reference to the accompanying drawings, in which:

FIG. 2A is a flow chart of a first display process performed by the light ECU in the light control device according to the first embodiment of the present invention;

FIG. 2B is a flow chart of a second display process performed by the light ECU in the light control device according to the second embodiment of the present invention;

FIG. 3 is a flow chart of a third display process performed by the light ECU in the light control device according to the third embodiment of the present invention;

FIG. 4A is a flow chart of an initializing process performed by the light ECU in the light control device according to the fourth embodiment of the present invention;

FIG. 4B is a flow chart of a fourth display process performed by the light ECU in the light control device according to the fourth embodiment of the present invention;

FIG. 5 is a timing chart showing the fourth display process to display the speed limit information on the driving road of the driver's vehicle;

FIG. 6 is a flow chart of a fifth display process performed by the light control device according to the fifth embodiment of the present invention;

FIG. 7 is a block diagram showing a schematic configuration of the light control device (as a display control device) equipped with the light ECU according to the sixth embodiment of the present invention;

DETAILED DESCRIPTION OF THE PREFERRED EMBODIMENTS

Figure 1:
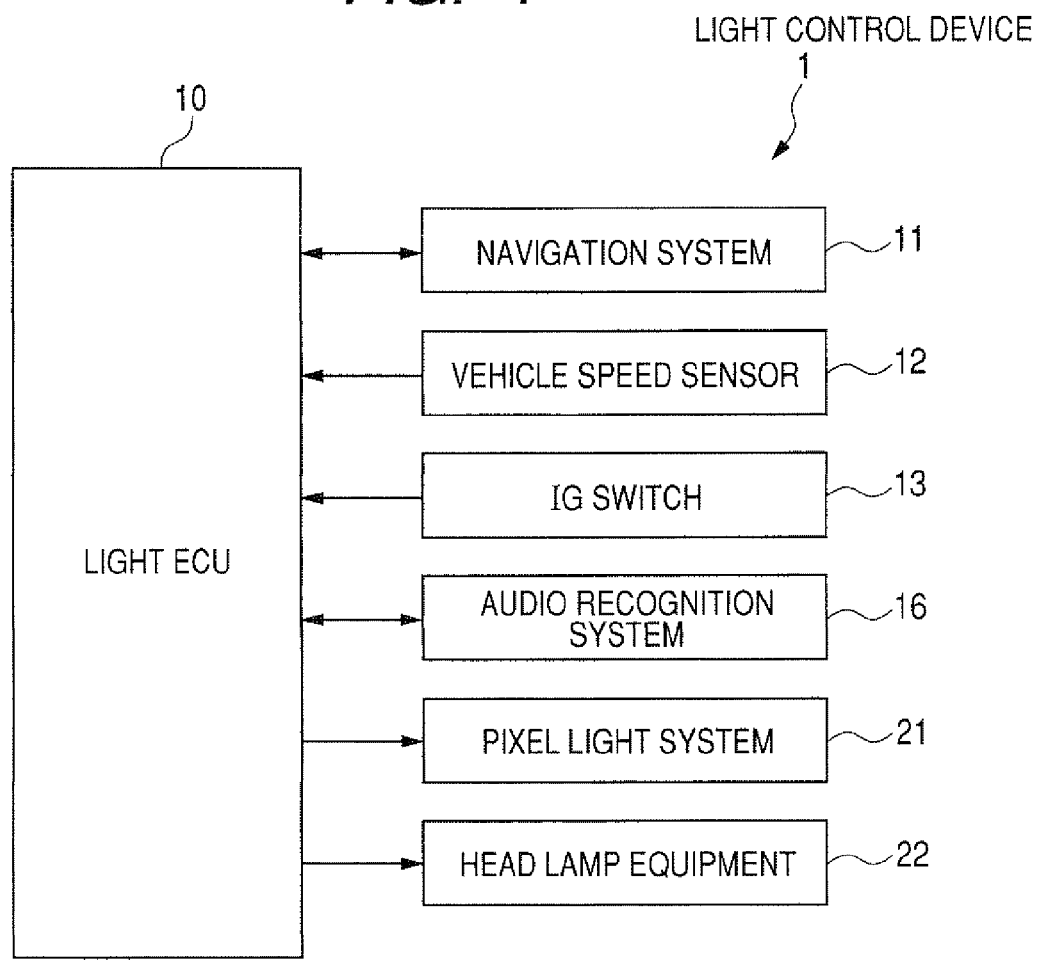
FIG. 1 is a block diagram showing a schematic configuration of a light control device (as a display control device) equipped with a light ECU according to the first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a light control device 1 (or a display control device as described in the claims) equipped with a light ECU 10 according to the first embodiment of the present invention with reference to FIG. 1 and FIG. 2A.

FIG. 1 is a block diagram showing a schematic configuration of the light control device 1 composed mainly of the light ECU 10 and other components according to the first embodiment of the present invention.

The light control device 1 or the display control device, is mounted to a motor vehicle. The light control device 1 is comprised mainly of the light electric control unit (or ECU) 10, a navigation system 11, a vehicle speed sensor 12, an ignition (IG) switch 13, an audio recognition system 16, a pixel light system 21 (or an irradiating means, or a projection means), and head light equipment 22.

The navigation system 11 has a memory in which a database of map data items is stored. The navigation system 11 receives radio waves transmitted from a well-known GPS (global positioning satellite), and detects the position of a driver's vehicle (or own vehicle) based on the received radio wave. The navigation system 11 searches the map data in the database stored in the memory. For example, the map data corresponds to an area near the current position of the driver's vehicle.

When searching it, the navigation system 11 displays both the current position of driver's vehicle and the retrieved map data on a display unit (not shown).

The database in the navigation system 11 stores information of the vehicle speed limitation on each road as the map data. On receiving a request to search for the vehicle speed limitation on the road on which the driver's vehicle is running, the data base searches the data stored in the data base, and obtains the target data item, and transfers the data item relating to the vehicle speed limit of the road to the light ECU 10.

The light ECU 10 can use the vehicle speed limit information on a road based on image data photographed by an on-vehicle camera or the information obtained by a vehicle communication system (omitted from drawings).

The vehicle speed sensor 12 is a known vehicle speed sensor. The vehicle speed sensor 12 detects the speed of the driver's vehicle (hereinafter, referred also to as the "vehicle speed" for short) and transfers the detected vehicle speed to the light ECU 10.

The audio recognition system 16 recognizes audio data (or voice) received through a microphone (not shown), and checks whether or not the received audio data agree with the audio data that have been stored in advance in the database. The audio recognition system 16 transfers an instruction corresponding to the comparison result to the light ECU 10.

The pixel light system 21 controls a plurality of mirrors to independently reflect the light transmitted from a light source in order to make display areas onto which no light is projected and other display areas onto which the light is projected. This makes various images such as speed information on the road. It is possible to use the head light equipment 22 as the light source.

It is possible to use a projector and the like instead of the pixel light system 21. The pixel light system 21 is so formed to irradiate the light relatively on a wide range, and to change the display position of the road, on which the image is displayed, based on the instructions corresponding to the display position. The display position is measured from the current position of the driver's vehicle to the target position on the road on which the image is displayed.

The head light equipment 22 is well-known front lamps placed at the front end right and left sides of the driver's vehicle.

The head light equipment 22 has lamps (not shown) and controls the optical axis of each lamp according to the instruction transferred from the light ECU 10.

The light ECU 10 is comprised mainly of a central processing unit (CPU), a read only memory (ROM), and a random access memory (RAM).

When receiving data corresponding to detection results of various types of sensors which are electrically connected to the light ECU 10, the light ECU 10 performs many processes based on the received detection results, for example, the process to operate the head light equipment 22, and the process to operate the pixel light system 21 in order to display the image on the road.

FIG. 2A is a flow chart of the first display process performed by the light ECU 10 in the light control device 1 according to the first embodiment of the present invention.

When the driver of the vehicle turns the ignition (IG) switch on (see FIG. 1) of the vehicle, the light ECU 10 starts the first display process to operate. This first display process is repeatedly performed at regular interval of time (for example, every 200 ms).

In the first process, the light ECU 10 obtains the speed limit at the current position of the driver's vehicle transferred from the navigation system 11 (step S110). Thus, the light ECU 10 serves as the vehicle speed information obtaining means.

The light ECU 10 instructs the pixel light system 21 to display (or project) the speed information, namely, to display the speed limit at the current position of the driver's vehicle (step S120). Thus, the light ECU 10 serves as the display control means in step S120. The light ECU 10 completes the operation of the first display process.

As described above, the light ECU 10 performs the first display process and instructs the pixel light system 21 to display the speed information relating to the speed limit at the current position of the driver's vehicle on the road.

In addition, the light ECU 10 repeatedly performs the first display process to retrieve the vehicle speed information, and instructs the pixel light system 21 to display the vehicle speed information on the road every time the vehicle speed information is obtained. It is thereby possible for the light control device 1 to immediately display the vehicle speed information of the driver's vehicle every change of the vehicle speed information based on the obtained vehicle speed information.

Second Embodiment

A description will be given of a light control device 2 (or the display control device as described in the claims) equipped with the light ECU 10 according to the second embodiment of the present invention with reference to FIG. 2B.

FIG. 2B is a flow chart of a second display process performed by the light ECU 10 in the light control device 2 according to the second embodiment of the present invention.

In the following description, only the difference of the second embodiment from the first embodiment will now be explained. The same components and operations between the first and second embodiments are omitted here for brevity.

The light control device 2 according to the second embodiment performs the second display process shown in FIG. 2B. In particular, the light control device 2 instructs the pixel light system 21 to display (or to project) the vehicle speed information regarding the vehicle speed limit on the road only when the speed of the driver's vehicle is not less than a predetermined speed value (or a predetermined reference value).

In the second display process shown in FIG. 2B, the light ECU 10 receives the current speed information of the driver's vehicle transferred from the vehicle speed sensor 12 (step S210). In step S210, the light ECU 10 serves as the vehicle speed information obtaining means.

The light ECU 10 judges whether or not the current speed of the driver's vehicle is not less than the predetermined speed value (for example, not less than 20 Km/h) (step S220). In step S220, the light ECU 10 serves as the speed judgment means.

When the judgment result at step S220 indicates that the current vehicle speed is not less than the predetermined speed value ("YES" at step S220), the light ECU 10 obtains the information regarding the speed limit at the current position of the driver's vehicle (step S230) from the navigation system 11 (step S230). In step S230, the light ECU 10 serves as the vehicle speed information obtaining means.

The light ECU 10 instructs the pixel light system 21 to display the obtained speed limit information on the road (step S240). In step S240, the light ECU 10 serves as the display control means.

The light ECU 10 thereby completes the second display process shown in FIG. 2B.

On the other hand, when the judgment result at step S220 indicates that the current vehicle speed is less than the predetermined vehicle speed value ("NO" at step S220), the light ECU 10 sets the function of the pixel light system 21 into "OFF" condition. That is, the light ECU 10 does not transfer any instruction to the pixel light system 21 to display the speed limit information on the road. The light ECU 10 then completes the second display process.

Under the "OFF" condition, the pixel light system 21 is so designed to halt displaying any image on the road until re-performing step S240 in order to display the speed limit information regarding the retrieved information.

In the second display process shown in FIG. 2B, the light ECU 10 judges whether or not the current speed of the driver's vehicle is not less than the predetermined vehicle speed value (as a reference speed value), and the light ECU 10 instructs the pixel light system 21 to display the retrieved speed limit information on the road only when the judgment result at step S220 indicates that the current speed of the driver's vehicle is not less than the predetermined vehicle speed value.

In a concrete example, the light ECU 10 obtains the current speed of the driver's vehicle and the speed limit information at the current position of the driver's vehicle on the road, performs the judgment whether or not the current speed of the driver's vehicle is not less than the predetermined vehicle speed value. The light ECU 10 instructs the pixel light system 21 to display the retrieved speed limit information on the road only when the judgment result indicates that the current speed of the driver's vehicle is not less than the predetermined vehicle speed value.

According to the second embodiment of the present invention, the light control device 2 instructs the pixel light system 21 to display (or to project) the speed limit information on the road only when the current vehicle speed is not less than the predetermined vehicle speed value. The driver of the vehicle easily recognizes the speed limit information displayed on the road. That is, there is a possibility that the driver of the vehicle cannot easily notice whether the information displayed on the road is important or not when the light ECU 10 controls the pixel light system 21 to always display the speed information on the road.

On the other hand, the light ECU 10 in the light control device 2 according to the second embodiment instructs the pixel light system 21 to display the speed information on the road only at the required time, namely, only when the current vehicle speed becomes not less than the predetermined vehicle speed value. This allows the driver of the vehicle to easily notice the speed limit information at the current position of the vehicle on the road, and reduces the load of the driver and passengers of the vehicle.

Third Embodiment

A description will be given of a light control device 3 (corresponding to the display control device as described in the claims) equipped with the light ECU 10 according to the third embodiment of the present invention with reference to FIG. 3.

FIG. 3 is a flow chart of the third display process performed by the light ECU 10 in the light control device 3 according to the third embodiment of the present invention.

The light control device 3 according to the third embodiment performs the third display process shown in FIG. 3, instead of the first and second display processes shown in FIG. 2A and FIG. 2B. The light control device 3 controls the pixel light system 21 to display the speed limit information on the road only when the current speed of the driver's vehicle is not less than the speed limit which is obtained.

In a concrete example, as shown in FIG. 3, the light control device 3 receives the current speed of the driver's vehicle transferred from the vehicle speed sensor 12 (step S310). In step S310, the light ECU 10 serves as the vehicle speed information obtaining means.

The light control device 3 further obtains the speed limit information at the current position of the driver's vehicle from the navigation system 11 (step S320). In step S320, the light ECU 10 also serves as the vehicle speed information obtaining means.

The light control device 3 judges whether or not the current speed of the driver's vehicle is not less than the speed limit at current position of the driver's vehicle retrieved from the navigation system 11 (step S330). In step S330, the light ECU 10 serves as the speed judgment means.

When the judgment result indicates that the current speed of the driver's vehicle is not less than the retrieved speed limit information ("YES" at step S330), the light control device 3 instructs the pixel light system 21 to display the speed limit information on the road (step S340). In step S340, the light ECU 10 serves as the display control means. The light control device 3 thereby completes the third display process shown in FIG. 3.

On the other hand, when the judgment result indicates that the current speed of the driver's vehicle is less than the retrieved speed limit information ("NO" at step S330), the light control device 3 sets the pixel light system 21, the function of which is capable of displaying the speed limit information, into the "OFF" condition (step S350). The light control device 3 thereby completes the third display process shown in FIG. 3.

In the light control device 3 according to the third embodiment, the light ECU 10 performs the third display process to obtain the current speed information of the driver's vehicle and the speed limit information at the current position of the driver's vehicle on the road. The light ECU 10 judges whether or not the current speed of the driver's vehicle is not less than the speed limit information. The light ECU 10 instructs the pixel light system 21 to display the speed limit information on the road only when the judgment result indicates that the current speed of the driver's vehicle is not less than the obtained speed limit information.

This provides the vehicle driver the easy recognition of the speed limit information at the current position of the vehicle on the road only when it is necessary, and further reduces the driving load of the driver and passengers of the vehicle.

Fourth Embodiment

A description will be given of a light control device 4 (or the display control device as described in the claims) equipped with the light ECU 10 according to the fourth embodiment of the present invention with reference to FIG. 4A, FIG. 4B, and FIG. 5.

FIG. 4A is a flow chart of an initializing process performed by the light ECU 10 in the light control device 4 according to the fourth embodiment of the present invention. FIG. 4B is a flow chart of a fourth display process performed by the light ECU 10 in the light control device 4 according to the fourth embodiment of the present invention.

The light control device 4 according to the fourth embodiment performs the initializing process shown in FIG. 4A, and performs the fourth display process shown in FIG. 4B, instead of the first to third display processes shown in FIG. 2A, FIG. 2B, and FIG. 3.

In the fourth embodiment, the light ECU 4 firstly performs the initializing process shown in FIG. 4A. The light ECU 10 then periodically performs the fourth display process shown in FIG. 4B. In the fourth display process, the light ECU 10 instructs the pixel light system 21 to display the speed limit information on the road until a dividing counter reaches the value "N", where "N" is a natural number. This dividing counter will be explained later.

The value of the dividing counter, first speed limit information such as a first speed limit, second speed limit information such as a second speed limit are stored into the RAM of the light ECU 10 every updating or obtaining.

The light ECU 10 performs the initializing process shown in FIG. 4A only when the driver of the vehicle turns the ignition (IG) switch 13 on. This initializing process initializes the dividing counter (namely, to zero) (step S410). The light ECU 10 sets the first speed limit ("SPEED LIMIT 1") of the driver's vehicle to zero (=0 Km/h) (step S420). The initializing process is thereby completed.

The light ECU 10 then performs the fourth display process shown in FIG. 4B.

First, the light ECU 10 obtains the speed limit information at the current position of the driver's vehicle. The light ECU 10 then sets the obtained speed limit information as the second speed limit ("SPEED LIMIT 2") (step S510). In step S510, the light ECU 10 serves as the vehicle speed information obtaining means.

The light ECU 10 compares the first speed limit with the second speed limit (step S520). When the comparison result indicates that both the first and second speed limits are same ("NO" in step S520), the light ECU 10 sets the pixel light system 21 into the "OFF" condition (step S590). The light ECU 10 then completes the fourth display process. The pixel light system 21 is capable of displaying (or of projecting) the speed limit information.

On the other hand, when the comparison result indicates that the first speed limit is not equal to the second speed limit ("YES" at step S520), the light ECU 10 controls the dividing counter to count up by one (step S530). The light ECU 10 judges whether or not the value of the dividing counter is not more than a predetermined upper-limit value "N" (step S540), where "N" is a natural number.

When the judgment result indicates that the value of the dividing counter is not more than the predetermined upper-limit value "N" ("YES" at step S540), the light ECU 10 instructs the pixel light system 21 to display the retrieved speed limit on the road (step S550). In step S550, the light ECU 10 serves as the display control means. The light ECU 10 completes the fourth display process.

On the other hand, when the judgment result indicates that the value of the dividing counter is more than the predetermined upper-limit value "N" ("NO" at step S540), the light ECU 10 sets the pixel light system 21 into the "OFF" condition (step S560).

The light ECU 10 replaces the first speed limit with the second speed limit (step S570), sets the dividing counter to the initial value "zero", and then completes the fourth display process.

A description will now be given of a concrete example of the fourth display process with reference to FIG. 5.

FIG. 5 is a timing chart showing the fourth display process to display the speed limit information on the road.

In the case shown in FIG. 5, the light ECU 10 performs the fourth display process at 400 ms period of time, and the value "5" is set as the upper-limit value of the dividing counter.

At the starting time shown in FIG. 5, because the first speed limit ("SPEED LIMIT 1") and the second speed limit ("SPEED LIMIT 2") have the same value of 40 Km/h, the light ECU 10 performs the step S520, and the 20 step S590 in order, and sets the display function of the pixel light system 21 to the "OFF" condition.

When the speed limit at the current position of the driver's vehicle on the road is changed, the light ECU 10 only changes the second speed limit, and maintains the first speed limit. In this situation, the light ECU 10 performs the steps S520 to S540, and the step S550 displays the second speed limit information on the road.

After this, because the first speed limit becomes equal to the second speed limit by the step S570, the light ECU 10 sets the function of the pixel light system 21 to display (or to project) the speed limit information into the "OFF" condition.

That is, during the fourth display process, the light ECU 10 in the light control device 4 controls the pixel light system 21 to display (or to project) the information relating to the running condition or environmental information for a constant period of time which is determined in advance.

Accordingly the light control device 4 having the light ECU 10 of the fourth embodiment can prevent causing trouble to the driver of the vehicle, which is caused by always displaying the same speed information on the road.

Fifth Embodiment

A description will be given of a light control device 5 (or the display control device as described in the claims) equipped with the light ECU 10 according to the fifth embodiment of the present invention with reference to FIG. 6.

The light control device 5 performs the fifth display process, instead of the first to fourth processes described before.

FIG. 6 is a flow chart of the fifth display process performed by the light ECU 10 in the light control device 5 according to the fifth embodiment of the present invention.

In the fifth display process, the light ECU 10 in the light control device 5 instructs the pixel light system 21 to display (or to project) the information regarding the speed limit for a constant period of time when the driver's vehicle passes through an intersection, with which several roads join together, from which roads branch off, and through which vehicles pass.

In the fifth display process shown in FIG. 6, the light ECU 10 obtains the information indicating whether or not the driver's vehicle passes through the intersection from the navigation system 11. The light ECU 10 judges whether or not the driver's vehicle has passed through the intersection (step S610). In step S610, the light ECU 10 serves as a passing detection means.

When the judgment result in step S610 indicates that the driver's vehicle does not pass the intersection ("NO" in step S610), the light ECU 10 sets into the "OFF" condition the function of the pixel light system 21 capable of displaying the speed limit information (step S680). The light ECU 10 then completes the fifth display process.

On the other hand, when the judgment result indicates that the driver's vehicle has already passed the intersection ("YES" in step S610), the light ECU 10 obtains the speed limit at the current position of the driver's vehicle on the road from the navigation system 11 (step S620). In step S620, the light ECU 10 serves as the vehicle speed information obtaining means.

The light ECU 10 instructs the dividing counter to count up by one (step S630). The light ECU 10 then judges whether or not the value of the dividing counter is not more than the predetermined upper-limit dividing value (step S640).

When the value of the dividing counter is not more than the predetermined upper-limit dividing value ("YES" in step S640), the light ECU 10 instructs the pixel light system 21 to display the retrieved information regarding the speed limit of the road (step S650). In step S650, the light ECU 10 serves as the display control means. The light ECU 10 then completes the fifth display process.

On the other hand, when the value of the dividing counter is more than the predetermined upper-limit dividing value N ("NO" in step S640), the light ECU 10 sets the function of the pixel light system 21 capable of displaying the speed limit information into the "OFF" condition (step S660).

The light ECU 10 then initializes the dividing counter (step S670), and then completes the fifth display process.

When receiving the control signal in the fifth display process, which indicates that the driver's vehicle has already passed the intersection, transferred from the navigation system 11, the light ECU 10 instructs the pixel light system 21 to display the speed information on the road.

The light control device 5 having the light ECU 10 can provide the vehicle speed information to the driver of the vehicle when the driver's vehicle is passing through the intersection where the driving conditions, such as the speed limit of the road, the types of the road joining the intersection, are often changed. Accordingly, the light control device 5 provides the warning of the vehicle speed limit to the driver of the vehicle.

Still further, the light ECU 10 in the light control device 5 displays the speed limit as the speed information to the driver of the vehicle through the pixel light system 21. This enables the driver of the vehicle to recognize the current speed limit when the vehicle passes through the intersection where the speed limit of the road is often changed.

Sixth Embodiment

A description will be given of a light control device 6 (or a display control device as described in the claims) equipped with the light ECU 10 according to the sixth embodiment of the present invention with reference to FIG. 7, FIG. 8A, and FIG. 8B.

The light control device 6 performs the sixth display process, instead of the first to fifth processes described before.

FIG. 7 is a block diagram showing a schematic configuration of the light control device 6 (as the display control device) according to the sixth embodiment of the present invention. FIG. 8A is a flow chart of the sixth display process performed by the light ECU 10 in the light control device 6 according to the sixth embodiment of the present invention.

The light control device 6 according to the sixth embodiment further has an illumination meter 14, a wiper device 15, and a vehicle distance detection device 17, in addition to the components in each of the light control devices 1 to 5 described before. In particular, the illumination meter 14 serves as an obstacle detection means and an urban area detection means. The wiper device 15 serves as the obstacle detection means and a weather detection means. The vehicle distance detection device 17 serves as the obstacle detection means and a vehicle distance detection means.

For example, the illumination meter 14 is placed on a dash board of the vehicle. The illumination meter 14 detects the brightness of the surrounding area of the vehicle, and transfers the detection result to the light ECU 10.

The wiper device 15 is well-known available wipers. In the sixth embodiment, the light control device 6 is so formed to electrically connect the wiper device 15 and the light ECU 10 together in order to detect the operation condition of the wiper device by the light ECU 10.

The vehicle distance detection device 17 is comprised of an on-vehicle camera and an image processing device. The vehicle distance detection device 17 has the function to perform image processing for the detected image by the on-vehicle camera and calculate the distance between the driver's vehicle and a front running vehicle (or a front vehicle, for short) based on the image processing result.

The light ECU 10 receives the data regarding the vehicle distance detected by the vehicle distance detection device 17. However, it is not necessary for the vehicle distance detection device 17 to have the camera and the image processing device, unless the vehicle distance detection device 17 has the function to detect the vehicle distance, for example, using a radar device or a sonar device.

The sixth display process detects obstacles to display (or to project) various types of vehicle information on the road such as the vehicle speed of a front running vehicle, weather information, brightness information of the surrounding area of the driver's vehicle. The six display process detects the presence of various types of obstacles which disturb the driver's observation. The sixth display process changes the display position of the vehicle information on the road based on the detection results.

Figure 8A:
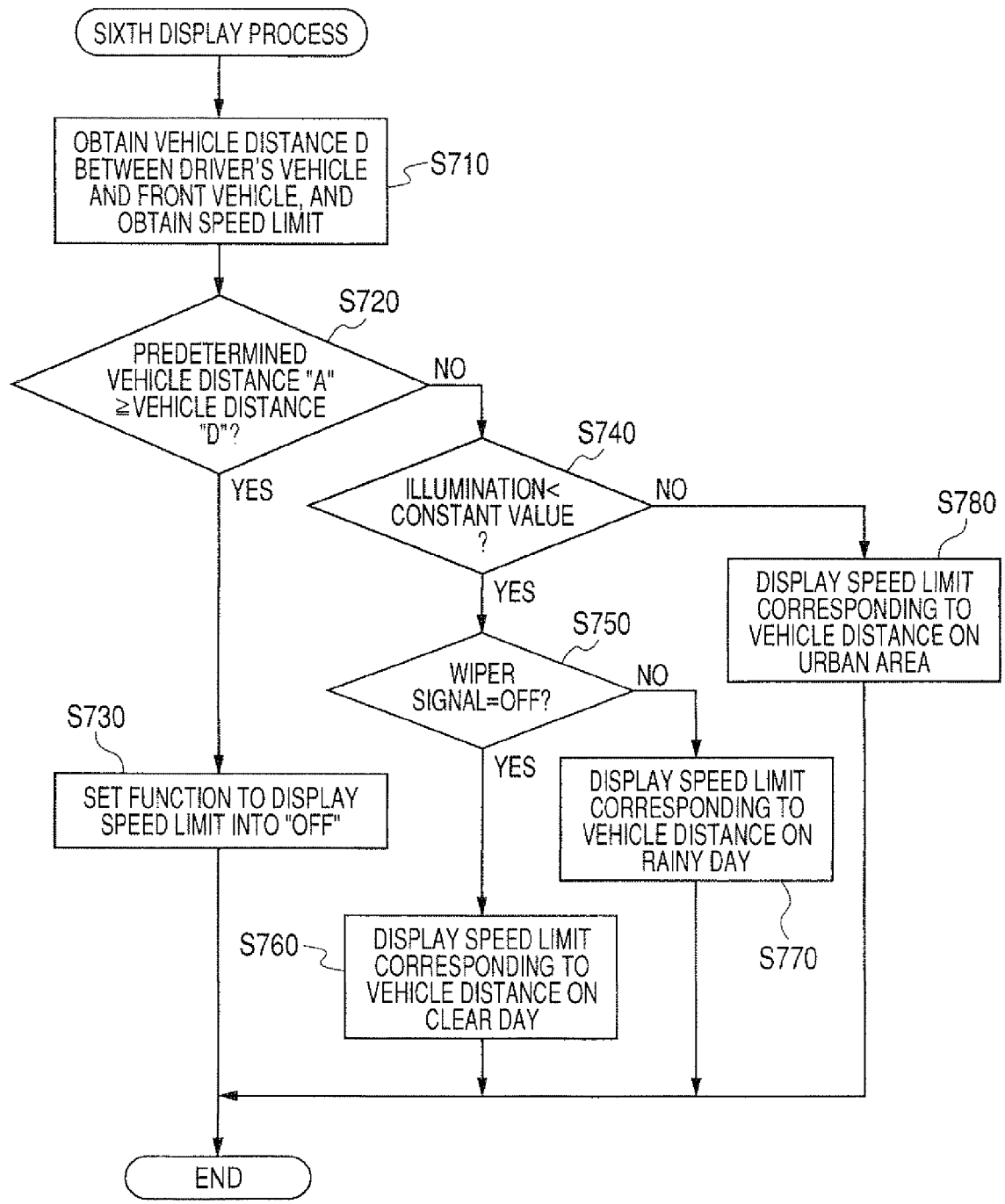
FIG. 8A is a flow chart of a sixth display process performed by the light ECU in the light control device according to the sixth embodiment of the present invention.

In a concrete example, as shown in FIG. 8A, the light ECU 10 obtains the information relating to the vehicle distance D between the driver's vehicle and a front running vehicle transferred from the vehicle distance detection device 17. The tight ECU 10 further receives the information relating to the speed limit at the current position of the driver's vehicle transferred from the navigation system 11 (step S710). In step S710, the light ECU 10 serves as the obstacle information obtaining means.

The light ECU 10 judges whether or not the vehicle distance D is not more than a predetermined vehicle distance "A" which is determined in advance (step S720).

The predetermined vehicle distance "A" is set so that the position of the front vehicle does not prohibit any irradiating and displaying the vehicle information on the road.

When the judgment result indicates that the vehicle distance D is not more than the predetermined vehicle distance "A", the light ECU 10 sets into the "OFF" condition the function of the pixel light system 21 capable of displaying the vehicle speed information on the road (step S730). The light ECU 10 then completes the sixth display process.

On the other hand, when the judgment result indicates that the vehicle distance D is more than the predetermined vehicle distance "A", the light ECU 10 obtains the detection result of the illumination meter 14, and compares the obtained illumination detection result with a predetermined comparison value (as a constant value) (step S740). In step S740, the light ECU 10 serves as the obstacle information obtaining means.

This predetermined comparison value is set in advance so that the judgment result is changeable by the presence of street lamps and neon signs.

When the judgment result indicates that the illumination detection result obtained from the illumination meter 14 is smaller than the predetermined comparison value (namely, when it is dark) ("YES" in step S740), the light ECU 10 judges whether or not the wiper device 15 is on operation (that is, the wiper device transfers the "ON" signal, step S750). In step S750, the light ECU 10 serves as the obstacle information obtaining means.

When the wiper device 15 is not currently in operation (that is, the wiper device transfers the "OFF" signal, "YES" in step S750), the light ECU 10 instructs the pixel light system 21 to display the speed limit of the road for the driver's vehicle on the target position of the road. This target position on the road is determined based on a map. The map stores the table indicating the relationship between the vehicle distance on clear day and the corresponding irradiating distance on which the vehicle speed limit information is displayed (step S760). In step S760, the light ECU 10 serves as the display control means. The light ECU 10 then completes the sixth display process.

On the other hand, when the wiper device 15 is in operation ("NO" in step S750), the light ECU 10 instructs the pixel light system 21 to display the vehicle speed limit on the area of the road which is determined using a map. This map stores a table indicating the relationship between the vehicle distance on rainy day and the corresponding irradiating distance for displaying the vehicle speed limit of the road for the driver's vehicle (step S770). In step S770, the light ECU 10 serves as the display control means.

When the detection result obtained from the illumination meter 14 is not less than the predetermined comparison value ("NO" in step S740), the light ECU 10 instructs the pixel light system 21 to display the vehicle speed limit of the road for the driver's vehicle on the position of the road which is determined using a map. This map stores a table indicating the relationship between the vehicle distance in an urban area and the corresponding irradiating distance for displaying the vehicle speed limit of the road for the driver's vehicle (step S780). In step S780, the light ECU 10 serves as the display control means. The light ECU 10 then completes the sixth display process.

Figure 8B:
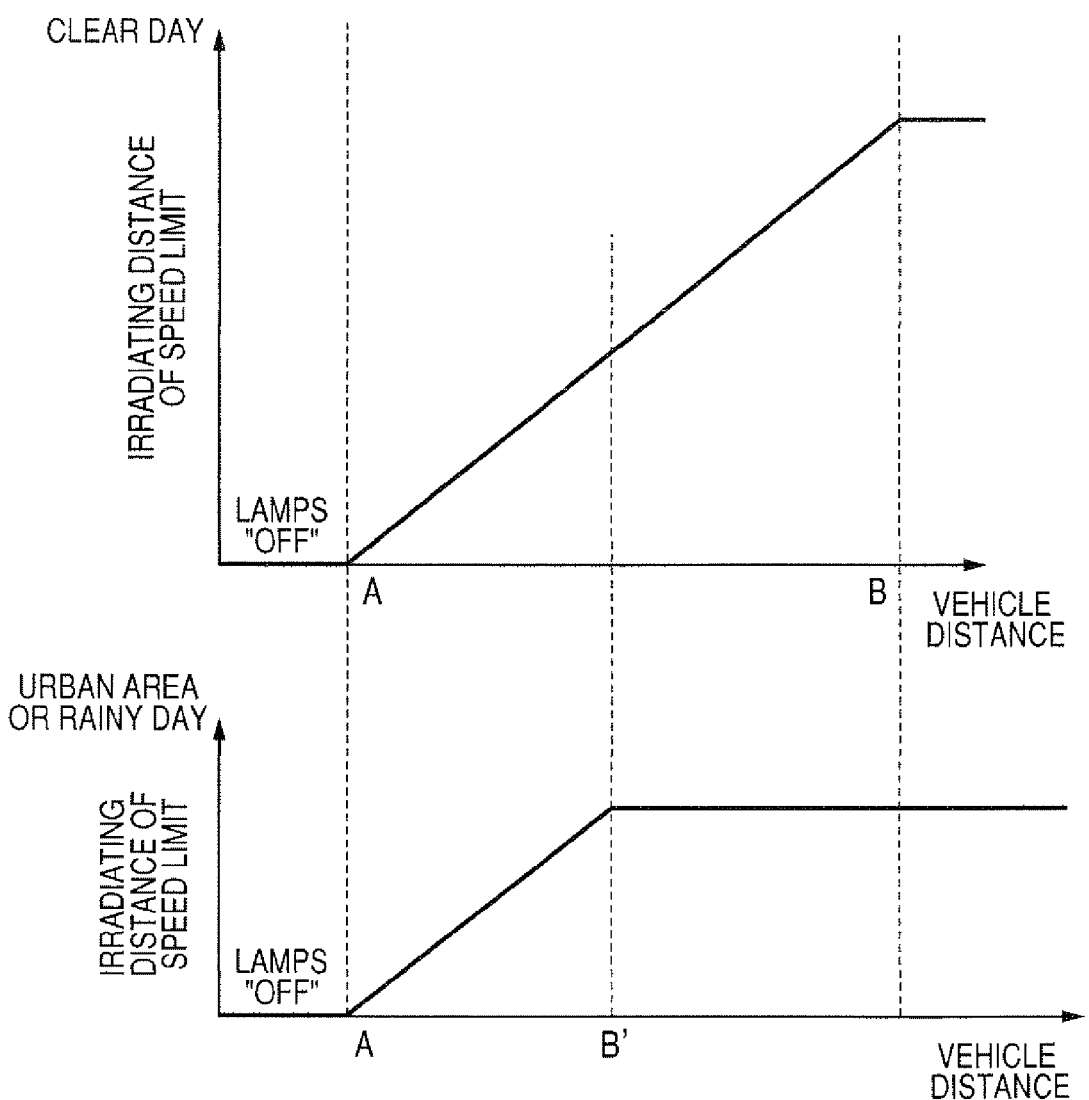
FIG. 8B shows two maps, the upper map shows the relationship between a vehicle distance on clear day and an irradiating distance for displaying the current speed limit of the driver's vehicle, and the lower map shows the relationship between an allowable vehicle distance between the driver's vehicle and a front running vehicle on rainy day or in an urban area and an irradiating distance (or projecting distance) for displaying a speed limit of the driver's vehicle.

FIG. 8B shows the above maps, the upper map shows the relationship between the vehicle distance on a clear day and the corresponding irradiating distance for displaying the vehicle speed limit of the road for the driver's vehicle, and the lower map shows the relationship between the vehicle distance on rainy day or an urban area and the irradiating distance for displaying the vehicle speed limit of the road for the driver's vehicle.

In the map for clear day, the light ECU 10 does not instructs the pixel light system 21 to display any vehicle speed limit on the road when the obtained vehicle distance D is not more than the predetermined vehicle distance "A".

As shown in FIG. 8B, the light ECU 10 increases the irradiating distance along a linear function according to increasing the vehicle distance when the obtained vehicle distance is larger than the predetermined vehicle distance "A" and less than a specified value "B" (A<B), and keeps a constant irradiating distance when the vehicle distance is not less than the specified value "B".

Similar to the map for clear day, the light ECU 10 does not instructs the pixel light system 21 to display any speed limit on the road when the obtained vehicle distance D is not more than the predetermined vehicle distance "A".

Further, the light ECU 10 increases the irradiating distance along the same linear function on clear day according to increasing the vehicle distance when the obtained vehicle distance is larger than the predetermined vehicle distance "A" and less than a specified value "B'" (A<B'<B), and keeps a constant irradiating distance when the vehicle distance is not less than the specified value "B'". In urban area, the light ECU 10 uses the map on rainy day.

That is, the light ECU 10 controls the pixel light system 21 to fix the irradiating distance to display the vehicle speed limit information to a short distance measured from the driver's vehicle when compared with the irradiating distance for clear day.

In the sixth display process according to the sixth embodiment, the light ECU 10 in the light control device 6 obtains the detection results transferred from the illumination meter 14, the wiper device 15, and the vehicle distance detection device 17. When the obtained detection result indicates the obstacle in displaying the speed limit information on the road, the light ECU 10 instructs the pixel light system 21 to change the display position into which the vehicle speed limit information is irradiated.

In general, it is considered that the driver of the vehicle can sometimes find it hard to recognize the vehicle speed information which is displayed on a forward position of the road measured from the driver's vehicle. In the sixth display process, the light ECU 10 controls the pixel light system 21 to change the display position (or irradiating position) on the road on which the vehicle speed information is displayed or projected when the inter-vehicle distance becomes decreased, weather becomes worse, and the driver's vehicle enters an urban area.

According to the sixth embodiment, the light ECU 10 in the light control device 6 can change the display target position for the vehicle speed information such as the speed limit information for the driver's vehicle even if detecting any obstacle to disturb the display of the vehicle speed information on the road. This provides the vehicle driver and passengers with easy recognition of the vehicle speed information.

Seventh Embodiment

A description will be given of a light control device 7 (or a display control device as described in the claims) equipped with the light ECU 10 according to the seventh embodiment of the present invention with reference to FIG. 9, FIG. 10A and FIG. 10B.

The light control device 7 performs the seventh display process, instead of the first to sixth processes described before.

Figure 9:
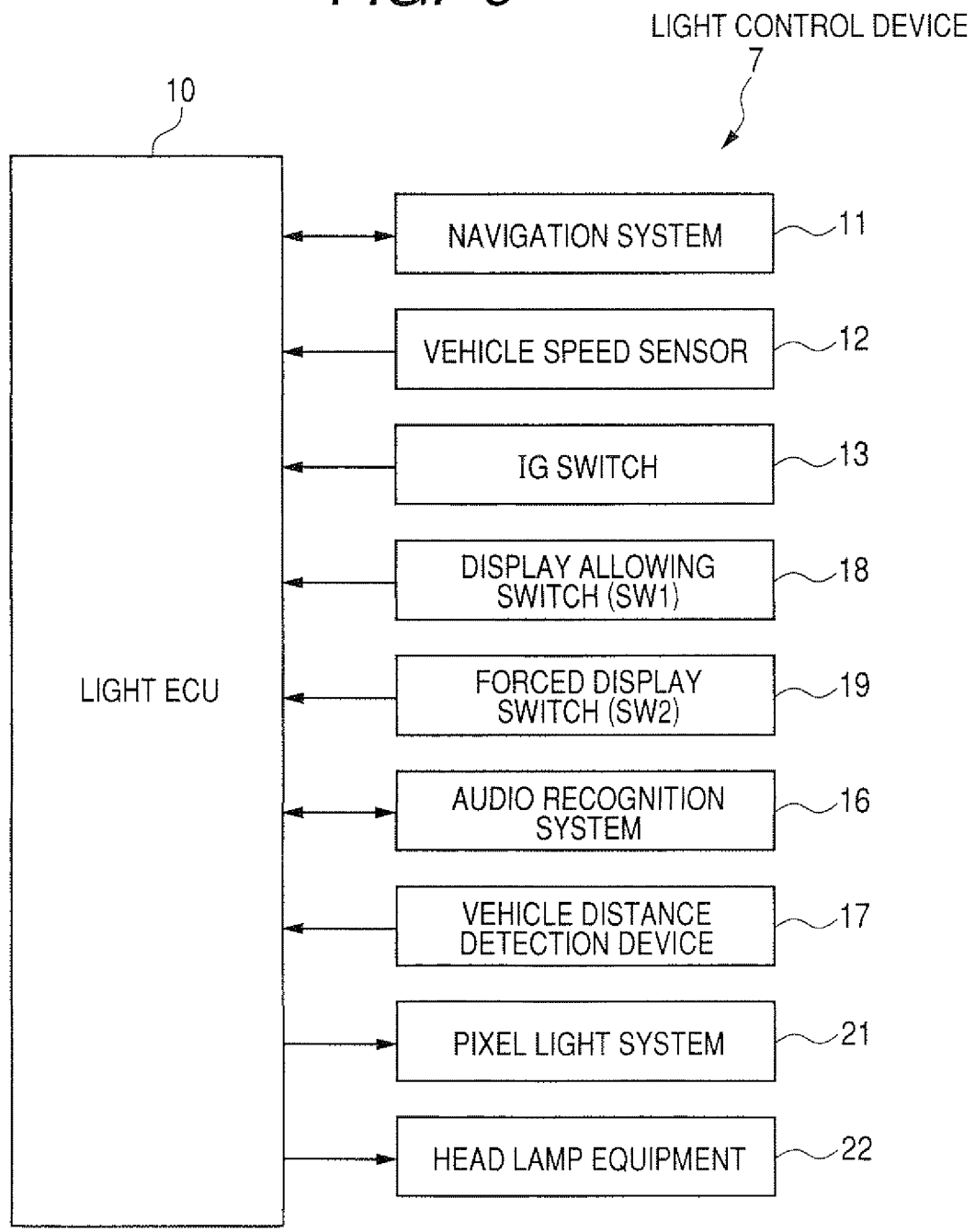
FIG. 9 is a block diagram showing a schematic configuration of the light control device (as a display control device) equipped with the light ECU according to the seventh embodiment of the present invention.

FIG. 9 is a block diagram showing a schematic configuration of the light control device 7 according to the seventh embodiment of the present invention. FIG. 10A is a flow chart showing the seventh display process performed by the light ECU 10 in the light control device according to the seventh embodiment of the present invention. FIG. 10B is a flow chart showing an eighth display process performed by the light ECU 10 in the light control device 7 according to the seventh embodiment of the present invention.

The light control device 7 according to the seventh embodiment further has the vehicle distance detection device 17, a display allowing switch (SW1) 18, and a forced display switch (SW2) 19, in addition to the components in each of the light control devices 1 to 5 described before.

In the seventh display process, it is sufficient for the light control device 7 to have the illumination meter 14 and the wiper device 15 in order to perform the seventh display process.

The display allowing switch (SW1) 18 permits the pixel light system 21 to operate when it is turned on, and prohibits the pixel light system 21 from operating when turned off.

Even if the display allowing switch (SW1) 18 is turned on, if another process prohibits the pixel light system 21 from operating, speed information such as speed limit information is not displayed on the road.

Turning the forced display switch (SW2) 19 on allows the pixel light system 21 to initiate its operation.

Even if the forced display switch (SW2) 19 is turned off, the vehicle speed information can be displayed on the road when the display allowing switch (SW1) 18 and another process (for displaying) permit the pixel light system 21 to operate.

Figure 10A:
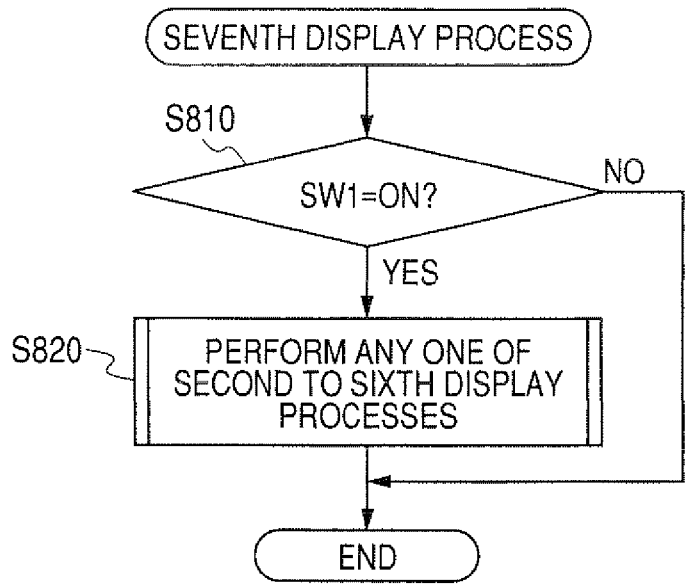
FIG. 10A is a flow chart showing a seventh display process performed by the light ECU in the light control device according to the seventh embodiment of the present invention.
Figure 10B:
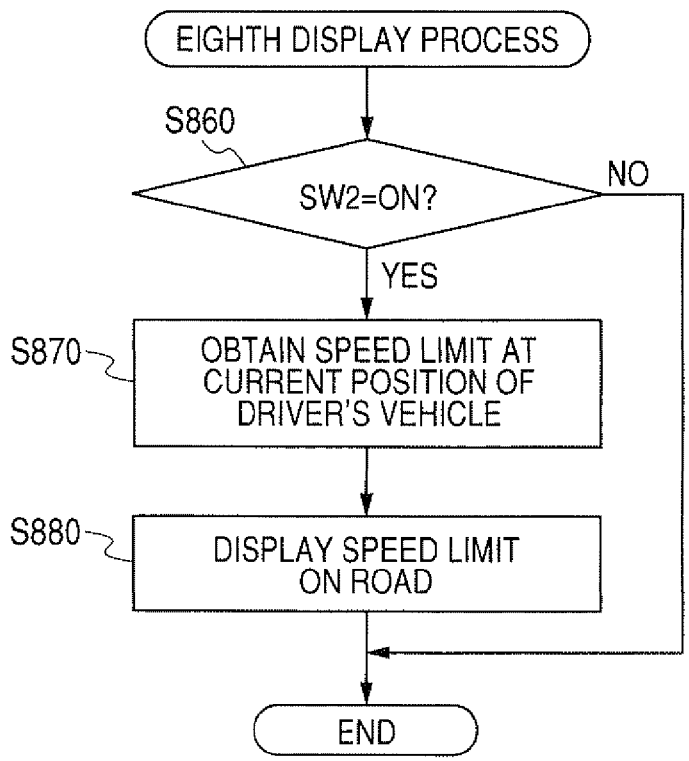
FIG. 10B is a flow chart showing an eighth display process performed by the light ECU in the light control device according to the seventh embodiment of the present invention.

In a concrete example, the light ECU 10 in the light control device 7 periodically performs the seventh display process shown in FIG. 10A and the eighth display process shown in FIG. 10B, in parallel.

In the seventh display process shown in FIG. 10A, the light ECU 10 judges whether or not the display allowing switch (SW1) 18 is turned on (step S810). When the judgment result indicates that the display allowing switch (SW1) 18 is turned on ("YES" in step S810), the light ECU 10 performs one of the second to sixth display processes, for example. The light ECU 10 then completes the seventh display process.

On the other hand, when the judgment result indicates that the display allowing switch (SW1) 18 is turned off ("NO" in step S810), the light ECU 10 immediately completes the seventh display process.

In the eighth display process shown in FIG. 10B, the light ECU 10 judges whether or not the forced display switch (SW2) 19 is turned on (step S860). When the judgment result indicates that the forced display switch (SW2) 19 is turned on ("YES" in step S860), the light ECU 10 obtains the vehicle speed limit information at the current position of the driver's vehicle on the road transferred from the navigation system 11 (step S870). In step S870, the light ECU 10 serves as the vehicle speed obtaining means.

The light ECU 10 instructs the pixel light system 21 to display the speed limit information on the road (step S880). In step S880, the light ECU 10 serves as the display control means. The light ECU 10 then completes the eighth display process.

On the other hand, when the judgment result indicates that the forced display switch (SW2) 19 is turned off ("NO" in step S860), the light ECU 10 completes the eighth display process.

It is acceptable to use the audio recognition system 16 in order to operate the display allowing switch (SW1) 18 and the forced display switch (SW2) 19.

In the seventh and eighth display processes of the seventh embodiment, it is possible for the driver's vehicle to decide to display the speed information on the road according to the driver's option.

(Other Modifications)

The concept of the present invention is not limited by the first to seventh embodiments described before.

In the vehicle speed display control described before, the first to seventh embodiments of the present invention determine to display or project the vehicle speed information based on the judgment result whether or not the vehicle speed of the driver's vehicle is not less than the predetermined speed value. In particular, a same value is used for both the predetermined vehicle speed to start the display of the vehicle speed information and the predetermined vehicle speed to complete the display of the vehicle speed information. However, it is possible to have different values for them.

Figure 11A:
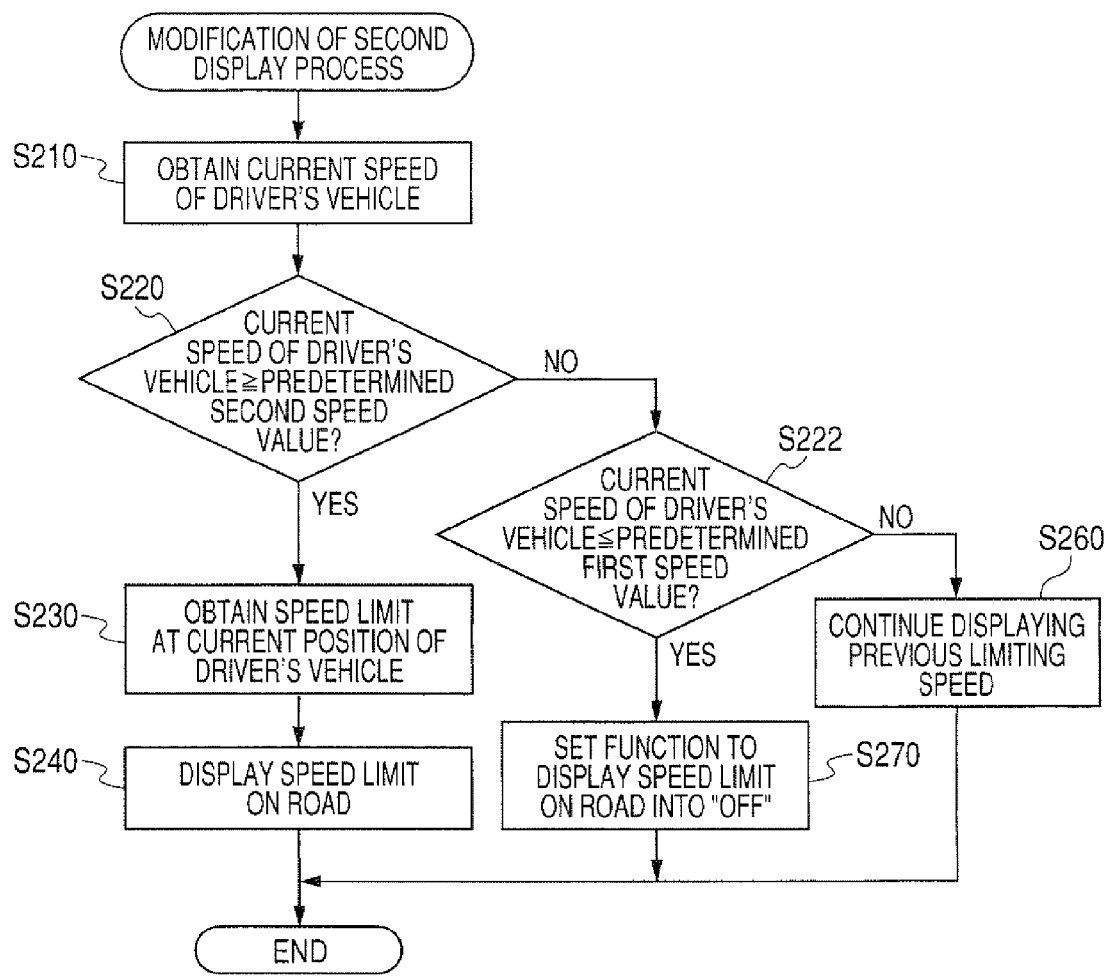
FIG. 11A is a flow chart showing a modification of the second display process performed by the light ECU in the light control device according to the second embodiment of the present invention shown in FIG. 2.
Figure 11B:
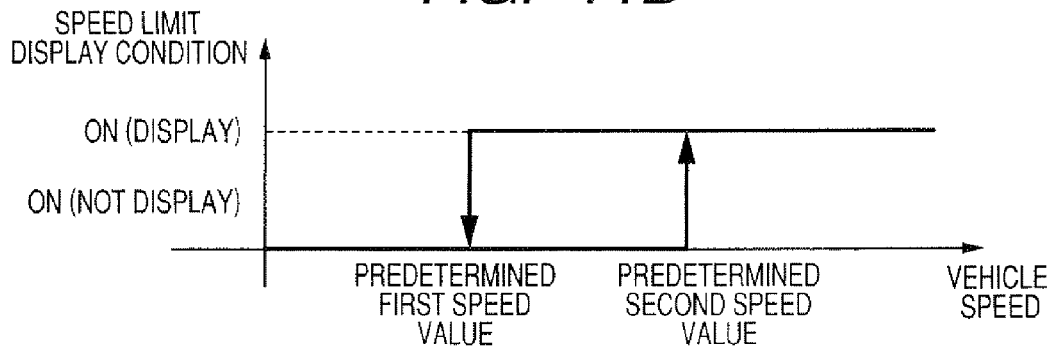
FIG. 11B is a hysteresis chart of the modification of the second display process performed by the light ECU in the light control device according to the second embodiment of the present invention.

A description will now be given of another modification of the second display process. FIG. 11A is a flow chart showing a modification of the second display process performed by the light control device according to the second embodiment of the present invention shown in FIG. 2. FIG. 11B is a hysteresis chart of the modification of the second display process according to the second embodiment of the present invention.

In the modification shown in FIG. 11A, the light ECU 10 judges whether or not the current speed of the driver's vehicle is not less than a predetermined second vehicle speed (corresponding to a predetermined second speed value) (step S220). When the judgment result indicates that the current speed of the driver's vehicle is not less than the predetermined second vehicle speed ("YES" in step S220), the light ECU 10 instructs the pixel light system 21 to display the vehicle speed limit at the current position of the driver's vehicle on the road.

On the other hand, when the judgment result indicates that the current speed of the driver's vehicle is less than the predetermined second vehicle speed ("NO" in step S220), the light ECU 10 further judges whether or not the current speed of the driver's vehicle is not less than a predetermined first vehicle speed (corresponding to a predetermined first speed value) (step S222), where the predetermined first vehicle speed is less than the predetermined second vehicle speed.

When the Judgment result indicates that the current speed of the driver's vehicle is less than the predetermined first vehicle speed ("YES" in step S250), the light ECU 10 sets the function of the pixel light system 21 into the "OFF" condition. The light ECU 10 then completes the modification process of the second display process.

On the other hand, when the judgment result indicates that the current speed of the driver's vehicle is not less than the predetermined first vehicle speed ("NO" in step S250), the light ECU 10 keeps the previous state in order to continue displaying the previous speed limit information (step S260). In step S260, the light ECU 10 serves as the display control means. The light ECU 10 then completes the modification process of the second display process shown in FIG. 11A.

According to the modification process of the second display process, the light ECU 10 instructs the pixel light system 21 to display the vehicle speed information on the road when the current speed of the driver's vehicle becomes not less than the predetermined second vehicle speed. The light ECU 10 instructs the pixel light system 21 to continue the display of the vehicle speed information until the current speed of the driver's vehicle becomes less than the predetermined first vehicle speed even if the current speed of the driver's vehicle is less than the predetermined second vehicle speed, as shown in the hysteresis chart of FIG. 11B. Still further, when the current speed of the driver's vehicle is less than the predetermined first vehicle speed (corresponding to the predetermined first speed value), the light ECU 10 instructs the pixel light system 21 to halt displaying the vehicle speed information on the road until the current speed of the driver's vehicle exceeds the predetermined second vehicle speed (corresponding to the predetermined second speed value).

The modification process of the second display process performed by the light ECU 10 in the light control device 2 can prevent the pixel light system 21 frequently performing the display/non-display operation for the vehicle speed information on the road.

On the other hand, in the light control device 6 according to the sixth embodiment of the present invention, the light ECU 10 detects the driving condition of the wiper device 15 when judging the weather. For example, it is possible to use a rain sensor or the navigation system 11, and possible for the light ECU 10 to receive the detection signals transferred from the rain sensor or the navigation system 11 in order to get the weather information from outside devices, or to change the displaying position on the road according to the weather condition.

Other Features and Effects of the Present Invention

In the display control device as another aspect of the present invention, the speed information obtaining means (for example, the navigation system 11 and the vehicle speed sensor 12) repeatedly obtains the vehicle speed information, and the display control means (the light ECU 10) instructs the irradiating means (the pixel light system 21) to display or to project the vehicle speed information every time the vehicle speed information is obtained.

This structure of the light control device according to the present invention displays the vehicle speed information immediately following and every time the vehicle speed information is changed.

In the display control device as another aspect of the present invention, the display control device, further has a speed judgment means (the light ECU 10). The speed judgment means judges whether or not the vehicle speed information obtained by the speed information obtaining means is not less than the predetermined reference speed. The display control means instructs the irradiating means to display the vehicle speed information only when the speed judgment means judges that the vehicle speed information is not less than the predetermined reference speed.

Thus, the display control device having the above structure displays the image relating to the vehicle speed information through the irradiating means only when the vehicle speed information is not less than the predetermined reference speed. The driver of the vehicle easily recognizes the vehicle speed information displayed on the road only when it is displayed on the road. That is, when the display control device always displays the vehicle speed information on the road, the driver of the vehicle must continuously notice the vehicle speed information displayed on the road regardless of having importance or no importance and being necessary or not necessary. On the other hand, according to the present invention, because the vehicle speed information is displayed on the road only when it requires the driver's immediate attention, the driver of the vehicle easily recognizes the important vehicle speed information displayed on the road.

The present invention provides the display control device as concrete examples. For example, the speed information obtaining means in the display control device obtains the vehicle speed information of the driver's vehicle and the speed limit information at a current position of the driver's vehicle on the road. The speed Judgment means judges whether or not the vehicle speed information of the driver's vehicle is not less than the predetermined reference speed. The display control means instructs the irradiating means to display the speed limit information only when the speed judgment means judges that the vehicle speed information is not less than the predetermined reference speed.

Still further, in the display control device, the speed information obtaining means obtains the vehicle speed information of the driver's vehicle and speed limit information at a current position of the driver's vehicle on the road. The speed judgment means judges whether or not the vehicle speed information of the driver's vehicle is not less than the speed limit information. The display control means instructs the irradiating means to display the speed limit information only when the speed judgment means judges that the vehicle speed information is not less than the speed limit information.

The display control device having the structure described above instructs the irradiating means to display the vehicle speed information on the road only when the current speed of the driver's vehicle is not less than the reference speed or the vehicle speed limit.

In the display control device as another aspect of the present invention, the display control means instructs the irradiating means to initiate displaying the vehicle speed information only when the speed judgment means judges that the vehicle speed information is not less than the predetermined reference speed. The display control means further continue displaying the vehicle speed information of the driver's vehicle until the speed judgment means judges that the vehicle speed information becomes less than a predetermined another reference speed which is set in advance to be smaller than the predetermined reference speed.

The display control device having the above structure prevents any unnecessary repetition of displaying and non-displaying the vehicle speed information on the road because the display control device continues to display the vehicle speed information until the vehicle speed becomes less than the predetermined another reference speed, and continues not to display any vehicle speed information until the vehicle speed becomes not less than the predetermined reference speed.

The display control device as another aspect of the present invention further has a passing detection means (the light ECU 10) that receives the information transferred from the navigation system 11, and detects the completion of the driver's vehicle passage through an intersection including a branch point of roads and a joint point of roads. In the display control device, when receiving a control signal which indicates the completion of the driver's vehicle passage through the intersection transferred from the passing detection means, the display control means instructs the irradiating means to display the vehicle speed information.

Because the display control device having the above structure provides the driver of the vehicle with the vehicle speed information immediately after the vehicle passes through the intersection where the road condition is often changed, it is possible to give the driver's attention to the vehicle speed information.

Displaying the speed limit of the road as the vehicle speed information gives the drivers attention to the speed limit, in particular, at the time immediately following the passage of the vehicle through an intersection, because the speed limit is often changed at the intersection.

The display control device as another aspect of the present invention, further has an obstacle detection means (the illumination meter 14, the wiper device 15, or the vehicle distance detection device 17), and a display position changing means. The obstacle detection means detects an obstacle to display the vehicle speed information by the irradiating means that is controlled by the display control means. The display position changing means changes the display position for displaying the vehicle speed information to another display position to avoid any obstacle to display the vehicle speed information when the obstacle detection means detects the obstacle to display the vehicle speed information.

The display control device having the above structure changes the display position for the vehicle speed information on the road. Even if detecting any obstacle to display it, the display control device can change the current display position to another display position on the road which does not become any obstacle on displaying the vehicle speed information. The driver of the vehicle thereby easily recognizes the vehicle speed information which is displayed on the road.

For example, there are the vehicle distance between the driver's vehicle and a front running vehicle, weather, and urban area as obstacles to display the vehicle speed information. When the driver's vehicle more approaches the front running vehicle of the driver's vehicle, namely, the vehicle distance is gradually decreased, the weather becomes worse (clear day-->cloudy day--->rainy day--->a snow storm), or the driver's vehicle runs in an urban area, it becomes difficult for the vehicle driver and the vehicle passengers to recognize the vehicle speed information displayed on a forward position of the road. In order to solve this, the display position changing means changes the display position to a near display position when the above conditions occur, namely, when the driver's field of vision is decreased. It is thereby possible for the vehicle driver to easily recognize the vehicle speed information with certainly.

In the display control device as another aspect of the present invention, the display control means instructs the irradiating means to display the information relating a driving condition of the driver's vehicle and environment information around the driver's vehicle for a predetermined period of time.

The structure of the display control device avoids continuous display of same vehicle speed information, and sets the vehicle driver free from a nuisance.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A display control device mounted on a vehicle comprising:
    a vehicle speed sensor configured to obtain vehicle speed information relating to a driver's vehicle;
    a light system configured to irradiate an image displaying the vehicle speed information on a road on which the driver's vehicle drives;
    an electric control unit (ECU) configured to control the light system to display the vehicle speed information obtained by the vehicle speed sensor,
    wherein the ECU is comprised of a central processing unit (CPU), a read only memory (ROM), and a random access memory (RAM); and
    the ECU is configured to monitor the vehicle speed information obtained by the vehicle speed sensor with respect to a predetermined reference speed,
    wherein the predetermined reference speed is not a vehicle speed limit of the road on which the driver's vehicle drives, and
    the ECU is configured to instruct the light system to initiate displaying the vehicle speed information based on ECU judging that the vehicle speed information is greater than or equal to the predetermined reference speed, and to instruct the light system to halt displaying the vehicle speed information based on the ECU judging that the vehicle speed information becomes less than the predetermined reference speed.

2. The display control device according to claim 1, wherein the vehicle speed sensor is configured to obtain the vehicle speed information of the driver's vehicle and a navigation system is configured to obtain speed limit information at a current position of the driver's vehicle on the road,
    the ECU is configured to judge that the vehicle speed information of the driver's vehicle is greater than or equal to the predetermined reference speed, and
    the ECU is configured to instruct the light system to display the speed limit information instead of the vehicle speed information based on the ECU judging that the vehicle speed information is greater than or equal to the predetermined reference speed.

3. The display control device mounted on a vehicle according to claim 1, further comprising:
    a navigation system configured to detect the completion of the passage of the driver's vehicle through an intersection which includes a branch point of roads or a joint point of roads,
    wherein, after receiving a control signal indicating the completion of the passage of the driver's vehicle through the intersection transferred from the navigation control system, the ECU is configured to instruct the light system to display the vehicle speed information.

4. The display control device of claim 1, wherein the light system is a pixel light system.

5. A display control device mounted on a vehicle, comprising:
    a vehicle speed sensor configured to obtain vehicle speed information relating to a driver's vehicle;
    a light system configured to irradiate an image displaying the vehicle speed information on a road on which the driver's vehicle drives;
    an electric control unit (ECU) configured to control the light system to display the vehicle speed information obtained by the vehicle speed sensor,
    wherein the ECU is comprised of a central processing unit (CPU), a read only memory (ROM), and a random access memory (RAM); and
    the ECU is configured to detect an obstacle, which disturbs the display of the vehicle speed information on the road, based on information received from at least one of:
    an on-vehicle camera and image processing device configured to detect vehicle distance between the driver's vehicle and a front running vehicle,
    a wiper device configured to detect a weather condition, and
    an illumination meter configured to detect the brightness of the surrounding area of the vehicle indicating driving in a urban area; and
    the ECU is configured to change the current display position for displaying the vehicle speed information on the road to another display position which does not disturb the display of the vehicle speed information based on ECU detection of at least one obstacle on the current display position on the road.

6. The display control device according to claim 5, wherein the ECU is configured to change the current display position to a near display position close to the position of the driver's vehicle on the basis of the detection result of the on-vehicle camera and image processing device which indicates a decrease of the vehicle distance between the driver's vehicle and the front running vehicle.

7. The display control device according to claim 5, wherein the ECU is configured to change the display position to a near display position which is near the driver's vehicle when the driver's field of vision is decreased based on the detection result of the wiper device indicating a weather condition becoming worse.

8. The display control device according to claim 5, wherein the ECU is configured to change the display position to another display position which is near the driver's vehicle on the basis of brightness of a surrounding area of the vehicle detected by the illumination meter based on the detection result indicating that the driver's vehicle drives in the urban area, when compared with the display position on the road when the driver's vehicle drives in another area other than the urban area.

9. The display control device of claim 5, wherein the light system is a pixel light system.

* * * * *